US010701136B1

United States Patent
Levi-Raz et al.

(10) Patent No.: US 10,701,136 B1
(45) Date of Patent: Jun. 30, 2020

(54) SYSTEM, METHOD, AND COMPUTER PROGRAM FOR MONITORING APPLICATION ACTIVITY FOR A CLUSTER OF APPLICATIONS

(71) Applicant: Amdocs Software Systems Limited, Dublin (IE)

(72) Inventors: Liad Levi-Raz, Kfar Neter (IL); Donal Burke, Dublin (IE); Idan Raphael, Herzliya (IL); Yue Liu, Dublin (IE); Dov Rosner, Kfar Yona (IL); Moti Pinhas, Shoham (IL)

(73) Assignees: AMDOCS DEVELOPMENT LIMITED, Limassol (CY); AMDOCS SOFTWARE SYSTEMS LIMITED, Dublin (IE)

( * ) Notice: Subject to any disclaimer, the term of this patent is extended or adjusted under 35 U.S.C. 154(b) by 677 days.

(21) Appl. No.: 14/836,783

(22) Filed: Aug. 26, 2015

(51) Int. Cl.
*G06F 15/16* (2006.01)
*H04L 29/08* (2006.01)
*H04L 12/26* (2006.01)

(52) U.S. Cl.
CPC .............. *H04L 67/10* (2013.01); *H04L 43/10* (2013.01)

(58) Field of Classification Search
CPC ......... G06F 9/45558; G06F 2009/4557; G06F 9/45533; G06F 11/3447; G06F 11/3409; G06F 9/5077; G06F 8/70; G06F 8/77; G06F 11/30; H04L 43/04; H04L 43/08; H04L 43/12; H04L 67/025; H04L 67/10; H04L 43/10
See application file for complete search history.

(56) References Cited

U.S. PATENT DOCUMENTS

| 6,801,940 | B1 * | 10/2004 | Moran | H04L 47/10 370/230 |
| 2003/0167270 | A1 * | 9/2003 | Werme | G06F 9/4856 |
| 2006/0037019 | A1 * | 2/2006 | Austin | G06F 8/10 718/100 |
| 2007/0083813 | A1 * | 4/2007 | Lui | G06F 11/3612 715/709 |
| 2009/0177567 | A1 * | 7/2009 | McKerlich | G06Q 30/04 705/35 |

(Continued)

OTHER PUBLICATIONS

"Cloudera Manager," Mar. 2015, pp. 1-2, retrieved from http://www.cloudera.com/content/cloudera/en/products-and-services/cloudera-enterprise/cloudera-manager.html.

(Continued)

*Primary Examiner* — Oleg Survillo
(74) *Attorney, Agent, or Firm* — Zilka-Kotab, P.C.

(57) ABSTRACT

A system, method, and computer program product are provided for monitoring application activity for a cluster of applications. In use, at least one application associated with a plurality of applications to monitor is identified. Further, metadata associated with an application flow corresponding to the at least one application is defined. The defined metadata is stored in at least one file that is accessible to at least one application server associated with the plurality of applications. Activity of the at least one application is monitored utilizing the metadata associated with the at least one application. Moreover, information associated with the at least one application is displayed based on monitoring the activity of the at least one application, utilizing at least one user interface.

5 Claims, 9 Drawing Sheets

(56) References Cited

U.S. PATENT DOCUMENTS

| | | | | |
|---|---|---|---|---|
| 2011/0276594 A1* | 11/2011 | Chong | ................ | G06F 11/3006 |
| | | | | 707/769 |
| 2013/0204948 A1* | 8/2013 | Zeyliger | ............. | G06F 9/44505 |
| | | | | 709/206 |
| 2015/0358391 A1* | 12/2015 | Moon | .................... | H04L 67/10 |
| | | | | 709/224 |
| 2017/0039236 A1* | 2/2017 | Li | .................... | G06F 17/30374 |

OTHER PUBLICATIONS

"Apache Ambari," Aug. 2015, p. 1, retrieved from https://ambari.apache.org/.

"Graphite in Launchpad," Aug. 2015, pp. 1-2, retrieved from https://launchpad.net/graphite.

\* cited by examiner

SYSTEM, METHOD, AND COMPUTER PROGRAM FOR MONITORING APPLICATION ACTIVITY FOR A CLUSTER OF APPLICATIONS

FIELD OF THE INVENTION

The present invention relates to application monitoring, and more particularly to monitoring data-driven applications for timely problem identification and efficient troubleshooting.

BACKGROUND

Many existing software platforms are associated with multiple data-driven applications. All of these data-driven applications need to be monitored for timely problem identification and efficient troubleshooting. However, each of these applications may use different data sources and/or follow a different path for data processing, while all the applications are running on the same platform and sharing its resources.

Existing solutions for monitoring applications are restricted to monitoring at the cluster level, as opposed to individual applications. So, while a user could potentially detect issues with, for example, a data store, the user could not understand how those issues affect higher-level applications, nor could the user detect issues resulting from the higher-level application, etc.

There is thus a need for addressing these and/or other issues associated with the prior art.

SUMMARY

A system, method, and computer program product are provided for monitoring application activity for a cluster of applications. In use, at least one application associated with a plurality of applications to monitor is identified. Further, metadata associated with an application flow corresponding to the at least one application is defined. The defined metadata is stored in at least one file that is accessible to at least one application server associated with the plurality of applications. Activity of the at least one application is monitored utilizing the metadata associated with the at least one application. Moreover, information associated with the at least one application is displayed based on monitoring the activity of the at least one application, utilizing at least one user interface.

DETAILED DESCRIPTION

Figure 1:
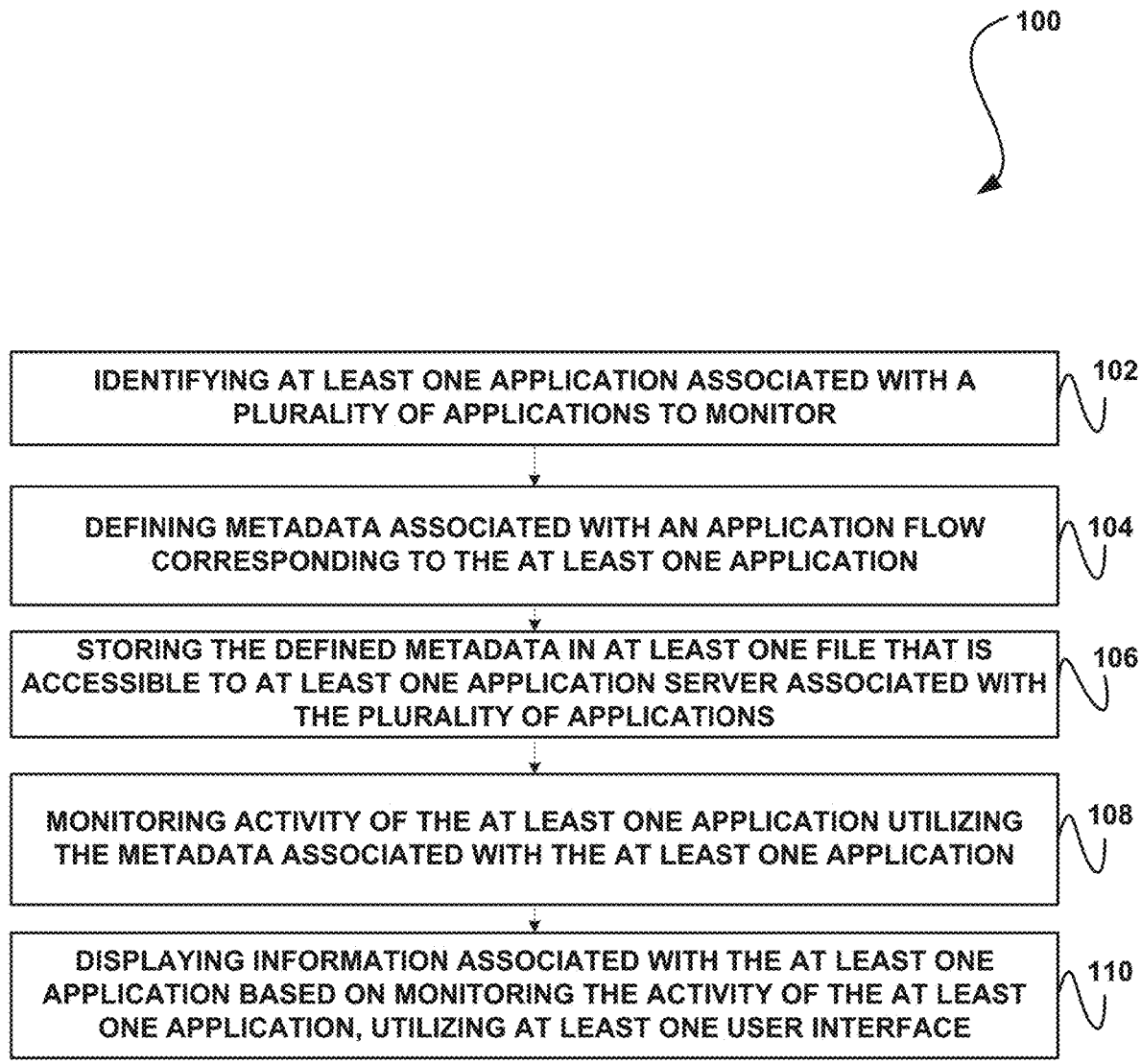
FIG. 1 illustrates a method for monitoring application activity for a cluster of applications, in accordance with one embodiment.

FIG. 1 illustrates a method 100 for monitoring application activity for a cluster of applications, in accordance with one embodiment.

As shown, at least one application associated with a plurality of applications to monitor is identified. See operation 102. The applications may include a cluster of multiple data-driven applications running on a common platform with shared resources. In this case, each data-driven application may be capable of using different data sources and may be capable of following a different path for data processing.

As one example, the cluster of applications may include a cluster of batch-based applications running on Hadoop. Apache Hadoop is an open-source software framework written in Java for distributed storage and distributed processing of very large data sets on computer clusters built from commodity hardware.

The applications may include any Big Data software applications (e.g. running on Hadoop, etc.). Moreover, the applications may be associated with any industry, such as the telecommunications industry.

As shown further in FIG. 1, metadata associated with an application flow corresponding to the at least one application is defined. See operation 104.

The defined metadata is stored in at least one file that is accessible to at least one application server associated with the plurality of applications. See operation 106.

Activity of the at least one application is monitored utilizing the metadata associated with the at least one application. See operation 108. The activity may include any activity or event associated with the application.

Moreover, information associated with the at least one application is displayed based on monitoring the activity of the at least one application, utilizing at least one user interface. See operation 110.

The defined metadata may include any data associated with the application that can be used to aid in monitoring aspects of the application. For example, the metadata may include a unique application name for the application.

As another example, the metadata may include information about one or more logical data flow elements associated with the application flow corresponding to the application. In this case, the information about the logical data flow elements associated with the application flow may include information associated with at least one data source for the application, at least one data store accessed by the application, at least one data upload process performed by the application, at least one data storing process performed by the application, at least one data manipulation process performed by the application, and/or various other activities and/or elements associated with data flow of the application.

The metadata may also include information to qualify an integrity of processes associated with the application. As another example, the information to qualify the integrity of the processes associated with the application may include information associated with one or more key performance indicators (KPIs) corresponding to the application. Monitoring data, such as one or more counters, may be utilized to manifest the metadata, such as the KPIs, etc.

As another example, the information to qualify the integrity of the processes associated with the application may include information associated with one or more thresholds corresponding to the application. In any case, the information to qualify the integrity of the processes may be utilized to generate alerts for events associated with the application. The events may be associated with data loss or long latency, etc.

Further, in one embodiment, the alerts for the events may be presented utilizing the user interface. Furthermore, the user interface(s) may utilize the metadata and data in different dashboards to provide different levels and viewpoints for easy error detection and troubleshooting for each of the applications in the cluster. In one embodiment, the Sugiyma algorithm and a Barycenter heuristic may be utilized to position elements in a visualization chart presented by the user interface to minimize line crossing of the elements, etc.

It should be noted that two or more of the operations of the method 100 may be combined, in various embodiments. It should also be noted that the method 100 may be implemented utilizing various hardware, software, applications, user interfaces, etc., as dictated by the implementer.

For example, in one embodiment, the method 100 may be implemented by a system as at least a portion of a big data analytics platform that serves multiple data-driven applications. For example, all of the data-driven applications may need to be monitored for timely problem identification and efficient troubleshooting. However, each of the applications may use different data sources and/or follow a different path for data processing, while all the applications are running on the same platform and sharing resources associated with the platform.

Thus, while the diversity is endless, the method 100 may be implemented to provide a framework for application creators to enable the monitoring of a specific application and an encapsulation of monitoring for all of the data-driven applications for the benefit of a system operator.

In one embodiment, the method 100 may be implemented by a system that is composed of two parts, a programmer's framework and a user interface based application. In this case, the programmer's framework may be used for defining the metadata for the application flow.

As noted, defining the metadata for the application flow may include defining the logical data flow elements (e.g. data sources, data stores, data upload/store processes, data manipulation processes etc.) and their relations. Additionally, defining the metadata for the application flow may include defining metadata to qualify the integrity of the processes, for example by using counters, KPls, and thresholds to generate alerts upon events, such as data loss and long latency, etc. This framework may also be used by jobs to report on associated counters in runtime.

The user interface based application may be used to enable the visualization of backend flows for the different applications, flashing out alerts, and allowing pin-pointing of errors to the relevant components. This allows for efficient troubleshooting by a user.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
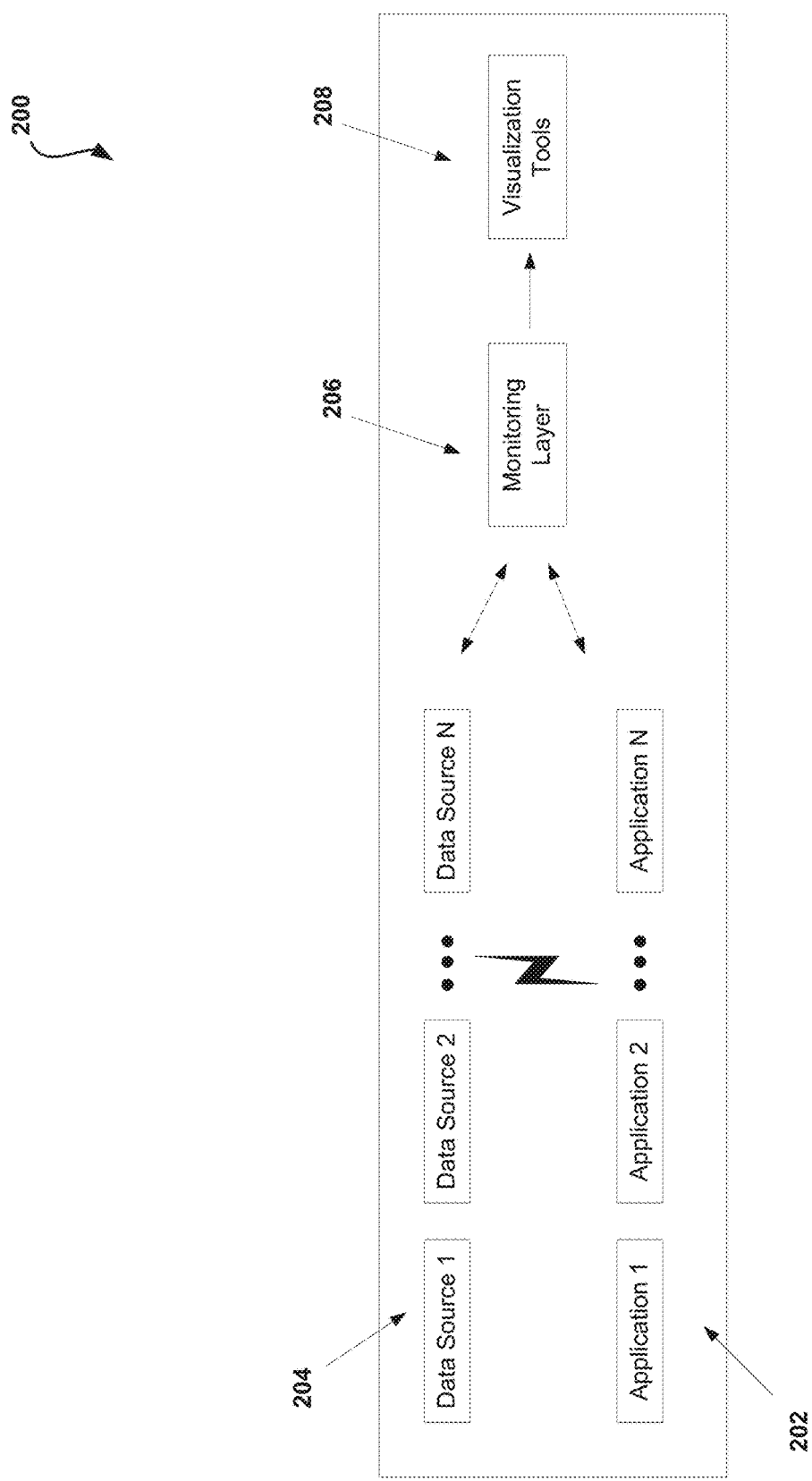
FIG. 2 illustrates a system for monitoring application activity for a cluster of applications, in accordance with one embodiment.

FIG. 2 illustrates a system 200 for monitoring application activity for a cluster of applications, in accordance with one embodiment. As an option, the system 200 may be implemented in the context of the details of FIG. 1. Of course, however, the system 200 may be implemented in the context of any desired environment, such as a Big Data environment (e.g. Hadoop-based, etc.). Further, the aforementioned definitions may equally apply to the description below.

As shown, the system 200 includes a cluster of data-driven applications 202. each in communication with one or more data sources 204. The data-driven applications 202 are monitored utilizing tools associated with a monitoring layer 206. Further, one or more visualization tools 208 (e.g. user interfaces, etc.) are used to display information (e.g. errors, etc.) associated with the data-driven applications 202.

In operation, the system 200 utilizes monitoring metadata, monitoring data, and monitoring visualization tools to monitor the multiple data-driven applications 202 for timely problem identification and efficient troubleshooting.

In one embodiment, monitoring metadata for any monitored application may include three portions. First, the monitoring metadata may include a unique application name. Second, the monitoring metadata may include a description of the components composing an application flow (e.g. data stores, store and upload jobs, data processing jobs, etc.) and their relationships. Third, the monitoring metadata may include key performance indicators and thresholds for qualifying the job.

In one embodiment, the metadata may be stored in the form of JSON (JavaScript Object Notation) files. These files may be stored, for example, on an administrator user interface application server. Users of a composer user interface may generate these JSON files and deploy them to the application servers. This allows for low cost addition of applications to be monitored, using a configuration-only technique. Of course, the metadata may be stored in various acceptable forms and files.

The metadata is loaded to the user interface layer at startup (e.g. using REST APIs provided by a BE layer, etc.). Once loaded into the user interface layer, the metadata is utilized in different views, as per the required context (e.g. an application view would show the flow of the application, including all resources and their relations; a resource matrix would show the resources association with the applications, but will not use the relations between the resources for this matter, etc.).

The composer user interface refers to a developer's framework for creating big data ETL jobs. For example, in one embodiment, the composer user interface may be an Eclipse plug-in that used to create big data application artifacts and set their behavior. A user can create and manipulate the artifacts using the Opus language. The Opus Editor provides the user with the functions to create each of the artifacts potentially needed for application flows.

With respect to monitoring data, counters may be generated by running jobs. In one embodiment, the counters may be stored into Graphite, which is an open-source software designed for monitoring and graphing the performance of computer systems. Additionally, a rule engine may be used for generating alerts upon exceeding thresholds. In one embodiment, the alerts may also be saved into Graphite. The thresholds may be defined and stored with their corresponding KPIs, as part of the metadata.

The monitoring visualization may be implemented utilizing one or more graphical user interfaces. The user interface(s) may utilize the monitoring metadata and monitoring data in different dashboards to provide different levels and viewpoints for easy error detection and troubleshooting.

Figure 3:
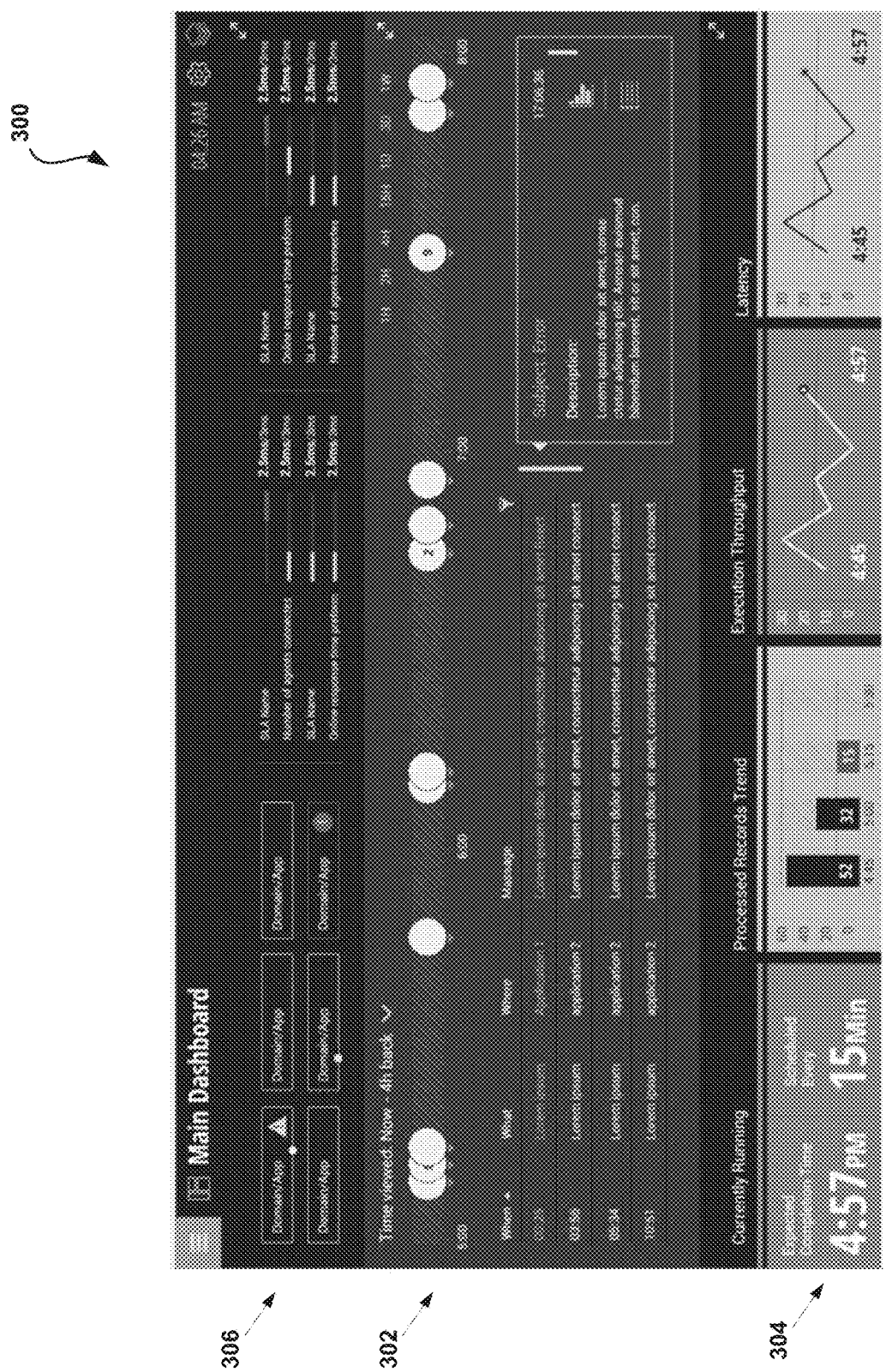
FIG. 3 illustrates a user interface showing a main dashboard for monitoring application activity for a cluster of applications, in accordance with one embodiment.

FIG. 3 illustrates a user interface 300 showing a main dashboard for monitoring application activity for a cluster of applications, in accordance with one embodiment. As an option, the user interface 300 may be implemented in the context of the details of the previous figures. Of course, however, the user interface 300 may be implemented in the context of any desired environment, such as a Big Data environment (e.g. Hadoop-based, etc.). Further, the aforementioned definitions may equally apply to the description below.

As shown, the main dashboard of the user interface 300 provides an operational view of the entire operational status of a plurality of applications, which in this case includes a plurality of Big Data Analytics (BDA) applications.

The user interface 300 includes three main areas. The first main area is a general status panel 302. The second main area is a KPI panel 304. The third main area is the top panel 306 that summarizes the status of six applications, as well as status of the cluster. In this view, the KPIs show a system-level performance for all big data applications being monitored.

Figure 4:
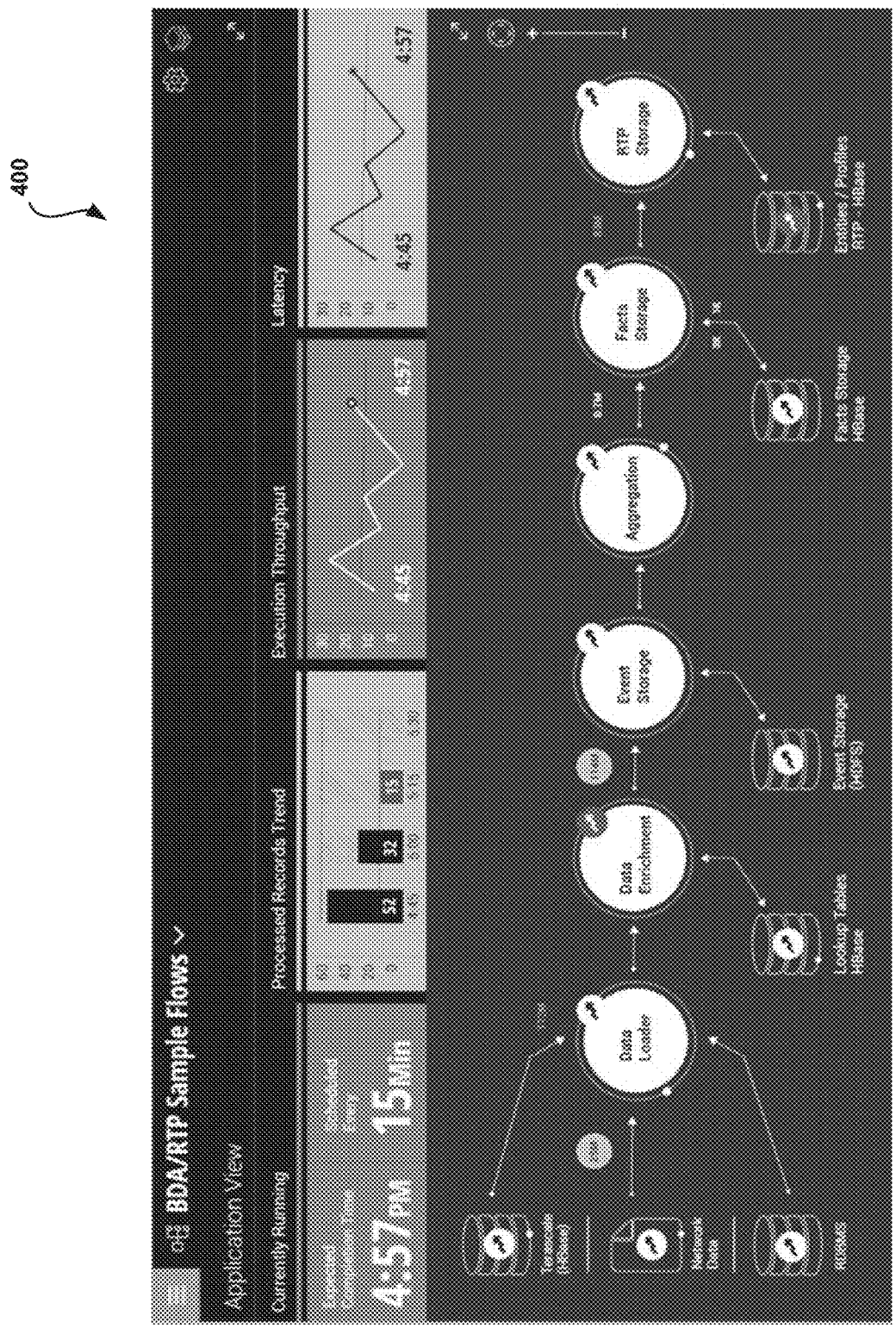
FIG. 4 illustrates a user interface showing an application visualizer for monitoring application activity for an application that may be part of a cluster of applications, in accordance with one embodiment.

FIG. 4 illustrates a user interface 400 showing an application visualizer for monitoring application activity for an application that may be part of a cluster of applications, in accordance with one embodiment. As an option, the user interface 400 may be implemented in the context of the details of the previous figures. Of course, however, the user interface 400 may be implemented in the context of any desired environment, such as a Big Data environment (e.g. Hadoop-based, etc.). Further, the aforementioned definitions may equally apply to the description below.

This view of the application visualizer illustrates the flow of a specific application deployed on the platform associated with the cluster of applications. The user interface 400 shows performance indicators that are displaying the current status of the application. In operation, the user can change the viewed application from the application selection menu of the user interface 400.

The rendering of the application flow graph may be performed utilizing a variety of techniques. For example, a d3.js may be used to draw the graph and an SVG object may be generated and inserted into html. D3.js is a JavaScript library for manipulating documents based on data.

In one embodiment, the Sugiyama Algorithm and Barycenter Heuristic may be used to position the elements in the visualization chart in a way that would minimize line crossing. The combination of these two existing techniques, together with reverting the normally vertical Sugiyama Algorithm to work left-to-right, is a unique solution to layout elements in the visualization chart.

Figure 5:
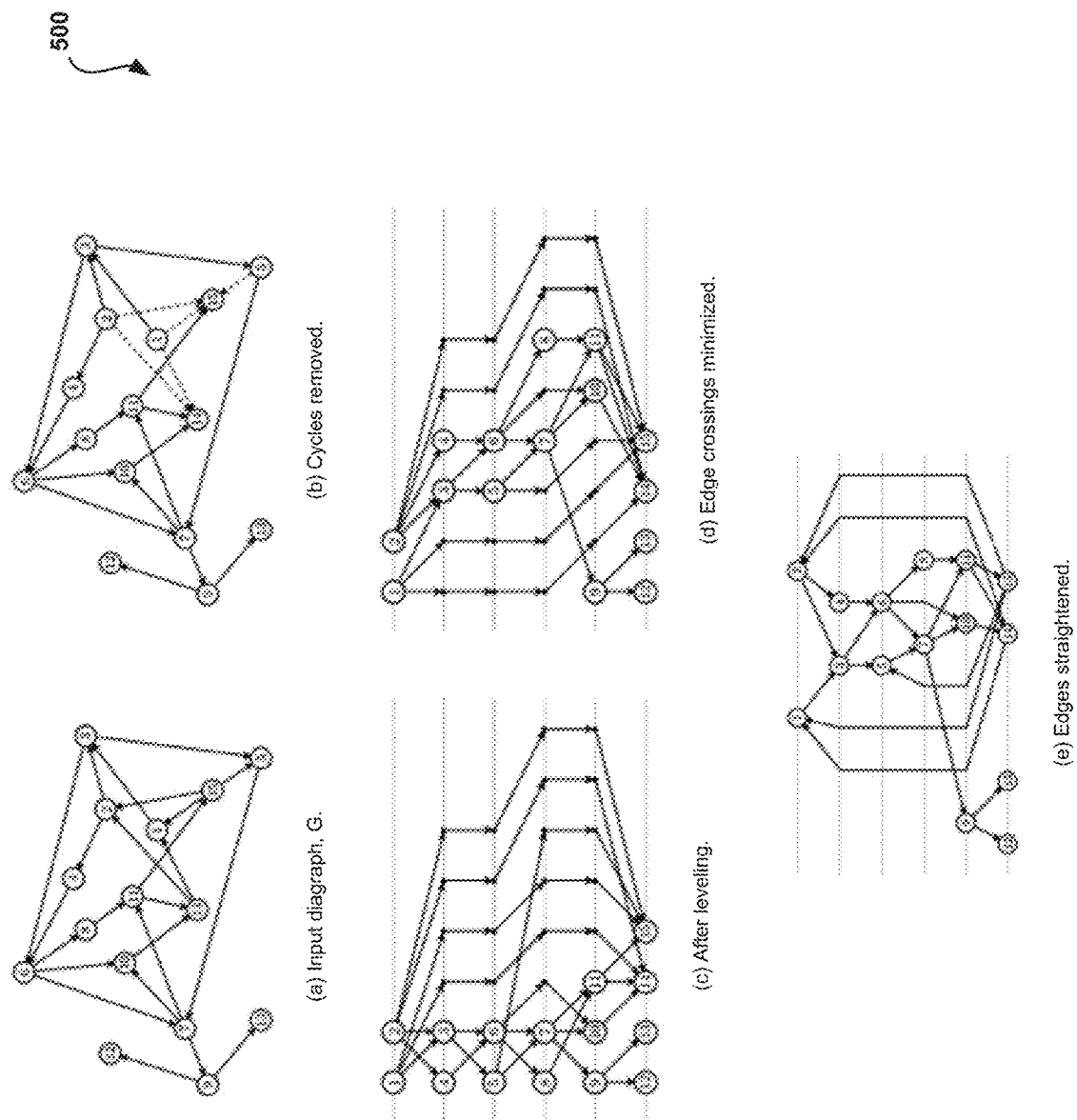
FIG. 5 illustrates an example of the Sugiyma Algorithm workflow, in accordance with one embodiment.

FIG. 5 illustrates an example 500 of the Sugiyama Algorithm workflow, in accordance with one embodiment. As an option, the example 500 may be implemented in the context of the details of the previous figures. Of course, however, the example 500 may be implemented in the context of any desired environment, such as a Big Data environment (e.g. Hadoop-based, etc.). Further, the aforementioned definitions may equally apply to the description below.

Step D of FIG. 5 to minimize line crossing and step E to straighten lines. This may be implemented within the code of the administrator user interface. The Barycenter Heuristic may then be used to position the elements in the visualization chart, thus minimizing line crossing.

Figure 6:
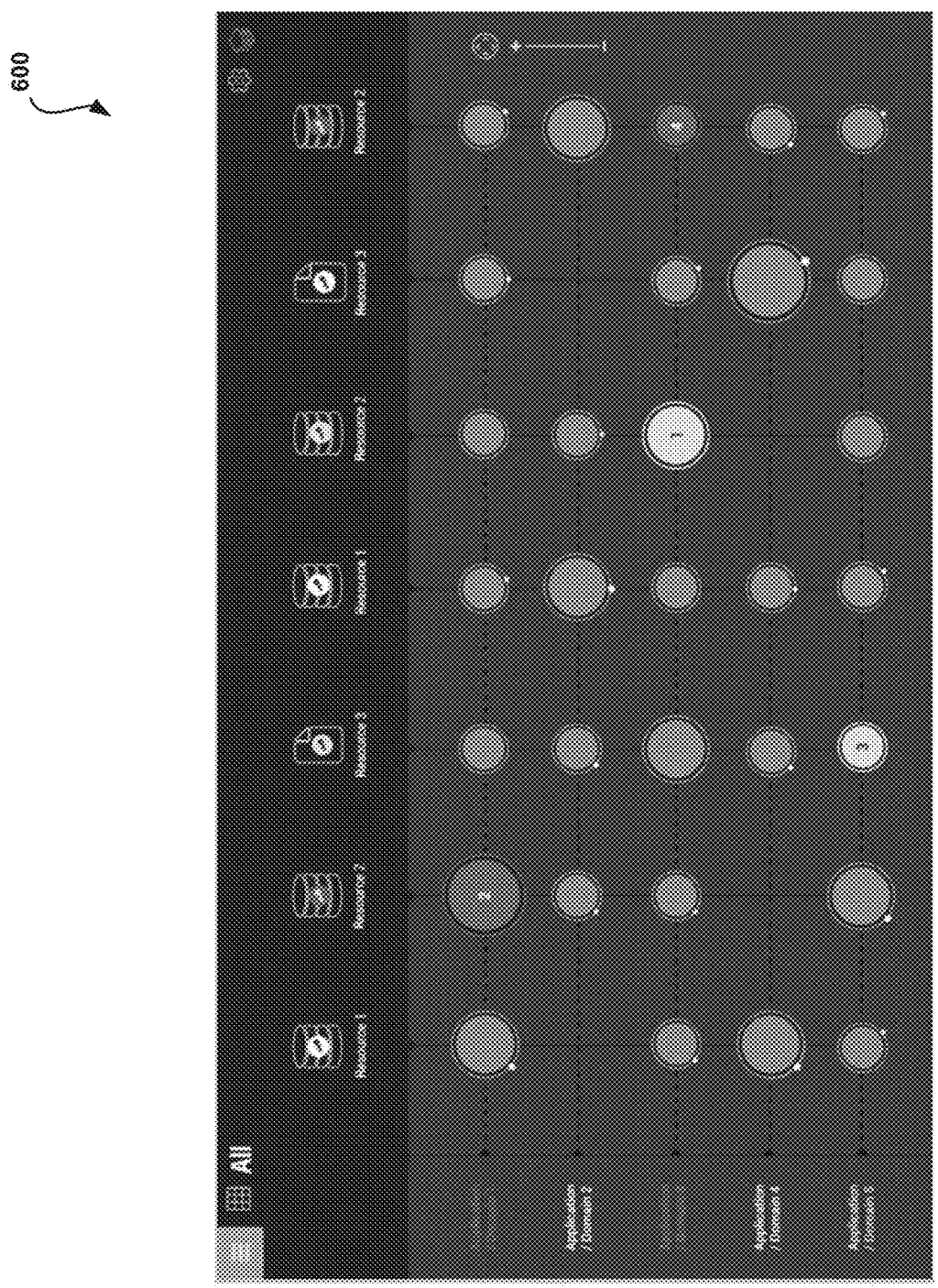
FIG. 6 illustrates a user interface showing a resource matrix for monitoring application activity for a cluster of applications, in accordance with one embodiment.

FIG. 6 illustrates a user interface 600 showing a resource matrix for monitoring application activity for a cluster of applications, in accordance with one embodiment. As an option, the user interface 600 may be implemented in the context of the details of the previous figures. Of course, however, the user interface 600 may be implemented in the context of any desired environment, such as a Big Data environment (e.g. Hadoop-based, etc.). Further, the aforementioned definitions may equally apply to the description below.

The dashboard displayed by the user interface 600 presents a high level overview of the relations between applications and resources. In operation, alerts shown on this screen allow an at-a-glance understanding of the affect that a faulty resource has on multiple applications.

Figure 7:
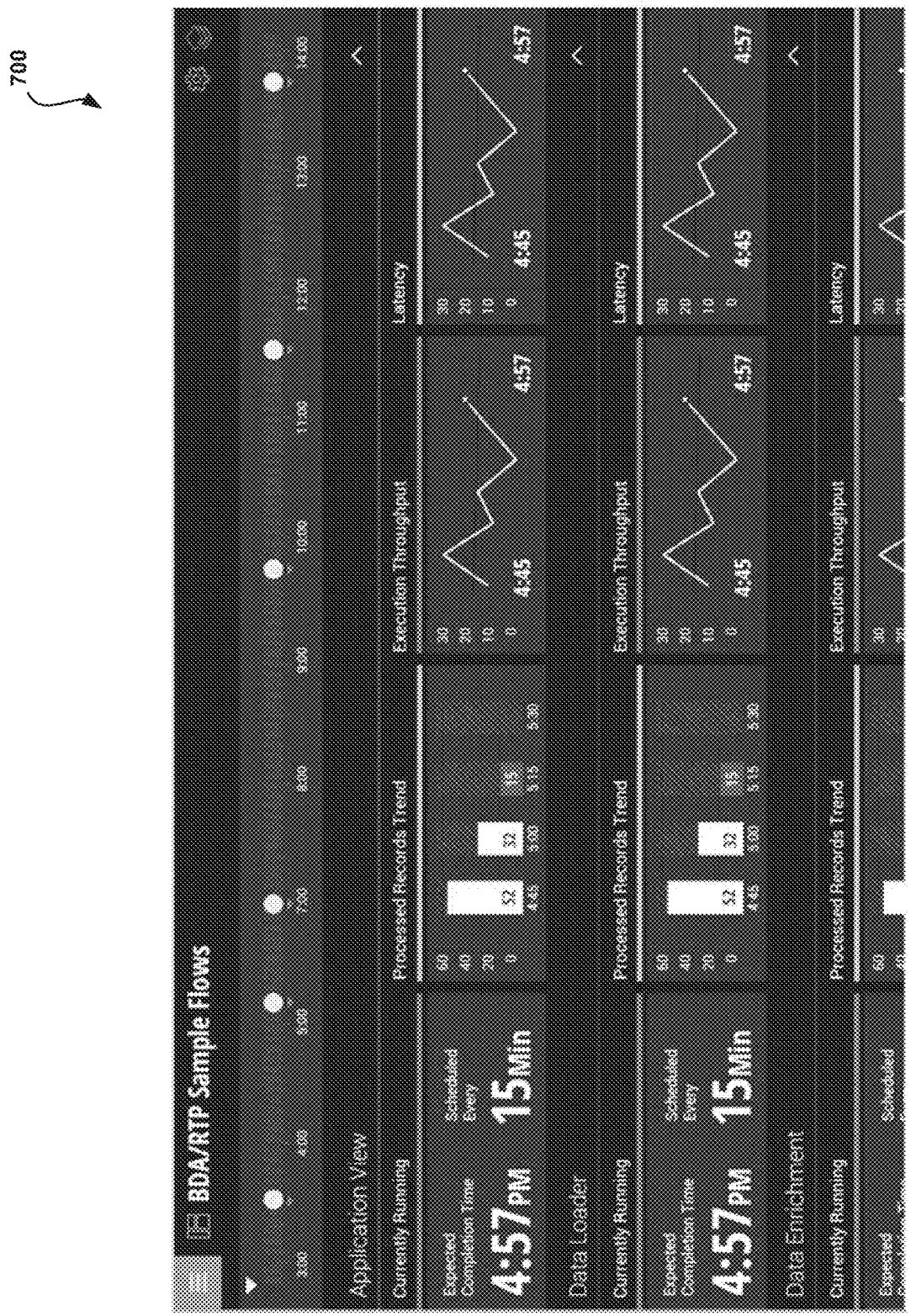
FIG. 7 illustrates a user interface showing an application key performance indicator viewer for monitoring application activity for an application that may be part of a cluster of applications, in accordance with one embodiment.

FIG. 7 illustrates a user interface 700 showing an application key performance indicator viewer for monitoring application activity for an application that may be part of a cluster of applications, in accordance with one embodiment. As an option, the user interface 700 may be implemented in the context of the details of the previous figures. Of course, however, the user interface 700 may be implemented in the context of any desired environment, such as a Big Data environment (e.g. Hadoop-based, etc.). Further, the aforementioned definitions may equally apply to the description below.

In the screen presented utilizing the user interface 700, all of the key performance indicators for all components/resources, as well as the global application key performance indicators may be shown in one view. In one embodiment, each component/resource/application may have a collapsible title so that the respective key performance indicators can be shown or hidden based on a user preference.

Thus, the tools and techniques described herein may be utilized to monitor multiple data-driven apps running on a big-data platform.

Existing solutions for monitoring disparate applications are restricted to monitoring at the cluster level. So, while a user could potentially detect issues with, for example, a data store, the user could not understand how those issues affect higher-level applications, nor could the user detect issues resulting from the higher-level application.

This leaves the responsibility of monitoring applications running on the cluster to the application itself, which could be costly both in development and in on-going operational costs. Additionally, existing solutions fail to provide an abstraction level of the application flow to enable the association of the monitored data with the logical components of the flow and the easy troubleshooting as a result.

The solution described herein provides an in-between layer abstracting the monitoring of any application (e.g. running on top of Hadoop, etc.) at a low cost both from application development and operational perspectives.

Figure 8:
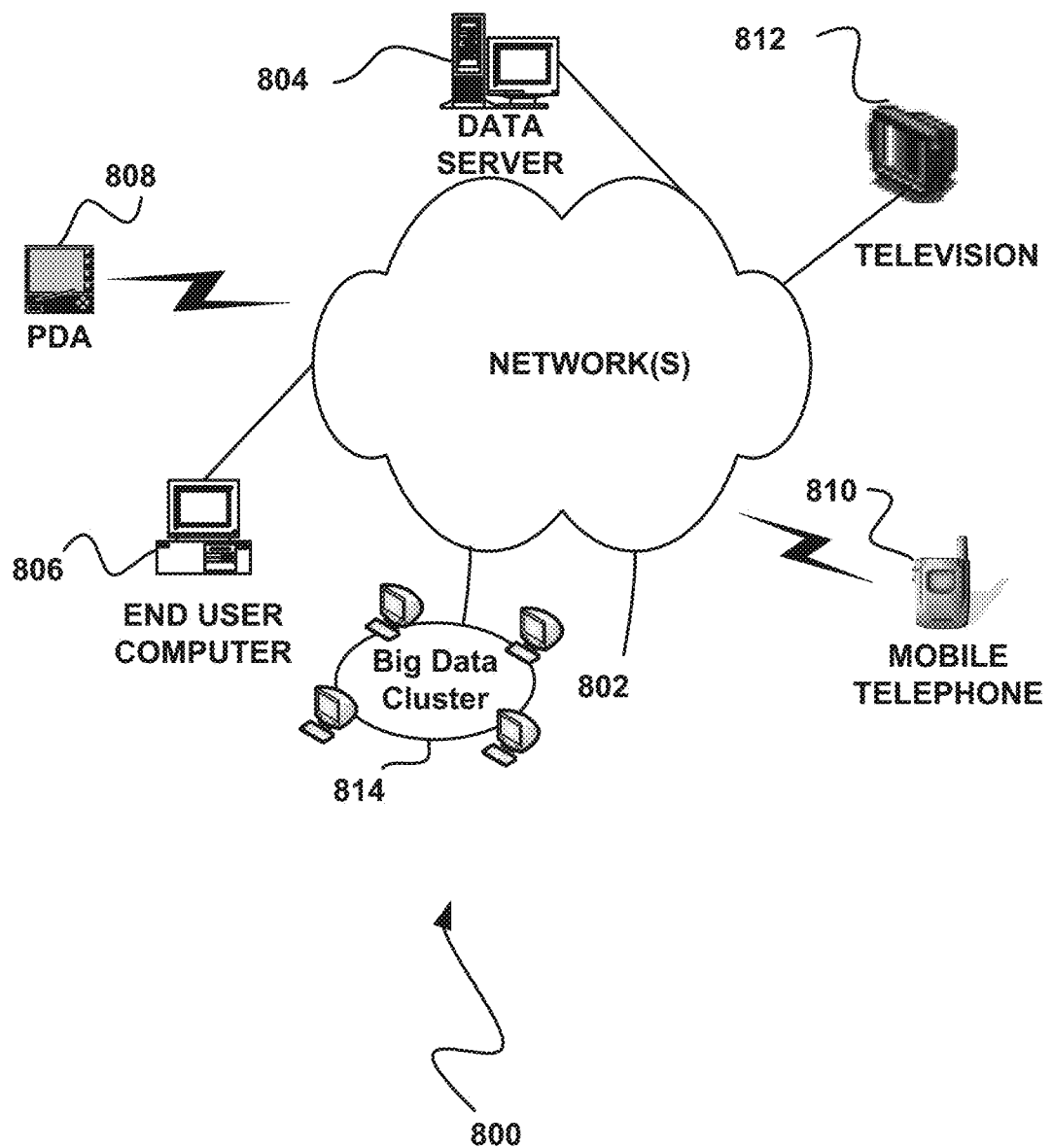
FIG. 8 illustrates a network architecture, in accordance with one possible embodiment.

FIG. 8 illustrates a network architecture 800, in accordance with one possible embodiment. As shown, at least one network 802 is provided. In the context of the present network architecture 800, the network 802 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 802 may be provided.

Coupled to the network 802 is a plurality of devices. For example, a server computer 804 and an end user computer 806 may be coupled to the network 802 for communication purposes. Such end user computer 806 may include a desktop computer, lap-top computer, and/or any other type of logic. Still yet, various other devices may be coupled to the network 802 including a personal digital assistant (PDA) device 808, a mobile phone device 810, a television 812, etc.

Moreover, a Big Data Cluster 814 may be coupled to the network 802. The Big Data Cluster 814 is a cluster of computers (i.e. nodes) on which Hadoop (or a derivative thereof) is running. Apache Hadoop is an open-source software framework written in Java for distributed storage and distributed processing of very large data sets on computer clusters built from commodity hardware. In various embodiments, other versions of Hadoop (e.g. commercialized versions, etc.) may be implemented.

Figure 9:
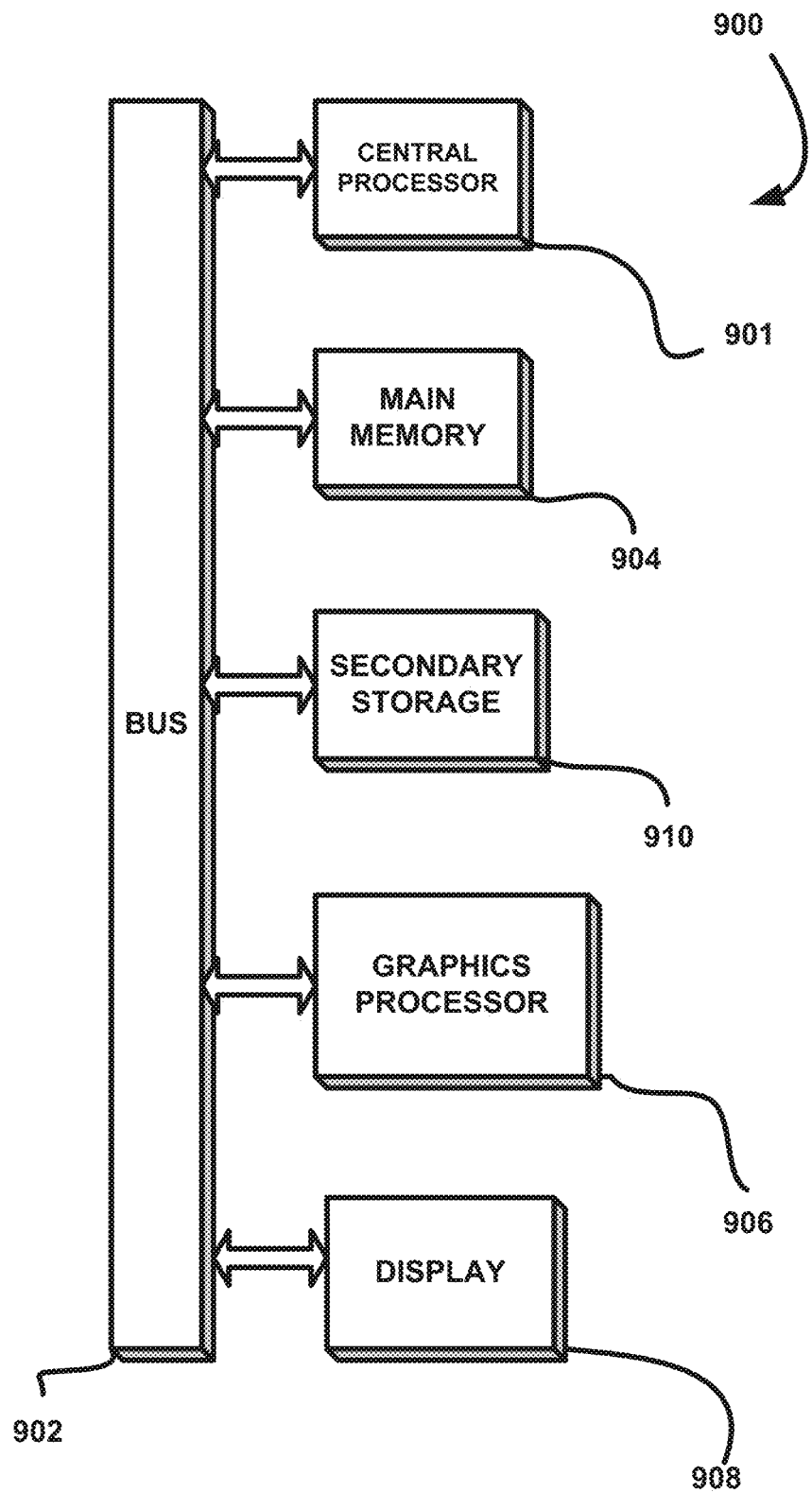
FIG. 9 illustrates an exemplary system, in accordance with one embodiment.

FIG. 9 illustrates an exemplary system 900, in accordance with one embodiment. As an option, the system 900 may be implemented in the context of any of the devices of the network architecture 800 of FIG. 8. Of course, the system 900 may be implemented in any desired environment.

As shown, a system 900 is provided including at least one central processor 901 which is connected to a communication bus 902. The system 900 also includes main memory 904 [e.g. random access memory (RAM), etc.]. The system 900 also includes a graphics processor 906 and a display 908.

The system 900 may also include a secondary storage 910. The secondary storage 910 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 904, the secondary storage 910, and/or any other memory, for that matter. Such computer programs, when executed, enable the system 900 to perform various functions (as set forth above, for example). Memory 904, storage 910 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
identifying each application in a cluster of applications to monitor, the cluster of applications sharing a plurality of resources while using different data sources and following different paths for data processing;
defining metadata associated with an application flow corresponding to each of the identified applications, the metadata defined for each of the applications indicating:
logical components of the application flow and their relationships, the components including: one of the different data sources used by the application, at least one data store accessed by the application, at least one data upload process performed by the application, at least one data storing process performed by the application, and at least one data manipulation process performed by the application, and
threshold information to qualify an integrity of processes of the application flow for use in generating alerts for events associated with the application, at least a portion of the events being associated with data loss;
storing the defined metadata in at least one file that is accessible to at least one application server associated with the cluster of applications;
monitoring activity of each of the applications utilizing the metadata associated with the application, including:
collecting data associated with the processes performed during the application flow corresponding to the at least one application,
qualifying the integrity of the processes by applying the threshold information that is included in the metadata to the collected data, and
detecting one or more errors associated with the processes, based on a result of qualifying the integrity of the processes; and
displaying information associated with each of the applications based on monitoring the activity of each of the applications including:
in an application view showing the application flow corresponding to the application and showing associated resources and their relations, displaying an indication of the one or more errors and relevant ones of the logical components of the application for use in troubleshooting thereof, and
in a resource matrix view, displaying an overview of relations between the plurality of applications and the resources, such that the displayed indication of the one or more errors illustrates an affect that a faulty one of the resources has on the plurality of applications.

2. A system, comprising:
one or more hardware processors for:
identifying each application in a cluster of applications to monitor, the cluster of applications sharing a plurality of resources while using different data sources and following different paths for data processing;
defining metadata associated with an application flow corresponding to each of the identified applications, the metadata defined for each of the applications indicating:
logical components of the application flow and their relationships, the components including: one of the different data sources used by the application, at least one data store accessed by the application, at least one data upload process performed by the application, at least one data storing process performed by the application, and at least one data manipulation process performed by the application, and
threshold information to qualify an integrity of processes of the application flow for use in generating alerts for events associated with the application, at least a portion of the events being associated with data loss;
monitoring activity of each of the applications utilizing the metadata associated with the application, including:
collecting data associated with the processes performed during the application flow corresponding to the at least one application,
qualifying the integrity of the processes by applying the threshold information that is included in the metadata to the collected data, and detecting one or more errors associated with the processes, based on a result of qualifying the integrity of the processes; and displaying information associated with each of the applications based on monitoring the activity of each of the applications, utilizing at least one user interface, including:

displaying information associated with each of the applications based on monitoring the activity of each of the applications including:

in an application view showing the application flow corresponding to the application and showing associated resources and their relations, displaying an indication of the one or more errors and relevant ones of the logical components of the application for use in troubleshooting thereof, and in a resource matrix view, displaying an overview of relations between the plurality of applications and the resources, such that the displayed indication of the one or more errors illustrates an affect that a faulty one of the resources has on the plurality of applications.

3. A computer program product embodied on a non-transitory computer readable medium, comprising computer code for:

identifying each application in a cluster of applications to monitor, the cluster of applications sharing a plurality of resources while using different data sources and following different paths for data processing;

defining metadata associated with an application flow corresponding to each of the identified applications, the metadata defined for each of the applications indicating:

logical components of the application flow and their relationships, the components including: one of the different data sources used by the application, at least one data store accessed by the application, at least one data upload process performed by the application, at least one data storing process performed by the application, and at least one data manipulation process performed by the application, and threshold information to qualify an integrity of processes of the application flow for use in generating alerts for events associated with the application, at least a portion of the events being associated with data loss;

storing the defined metadata in at least one file that is accessible to at least one application server associated with the cluster of applications;

monitoring activity of each of the applications utilizing the metadata associated with the application, including:

collecting data associated with the processes performed during the application flow corresponding to the at least one application, qualifying the integrity of the processes by applying the threshold information that is included in the metadata to the collected data, and detecting one or more errors associated with the processes, based on a result of qualifying the integrity of the processes; and displaying information associated with each of the applications based on monitoring the activity of each of the applications including:

in an application view showing the application flow corresponding to the application and showing associated resources and their relations, displaying an indication of the one or more errors and relevant ones of the logical components of the application for use in troubleshooting thereof, and in a resource matrix view, displaying an overview of relations between the plurality of applications and the resources, such that the displayed indication of the one or more errors illustrates an affect that a faulty one of the resources has on the plurality of applications.

4. The computer program product of claim 3, wherein the metadata defined for each of the applications includes a unique application name for the application.

5. The computer program product of claim 3, wherein a Sugiyma algorithm and a Barycenter heuristic are utilized to position elements in the application view to minimize line crossing.

* * * * *